United States Patent [19]
Yoshioka et al.

[11] Patent Number: 5,797,382
[45] Date of Patent: Aug. 25, 1998

[54] AIR ASSIST DEVICE OF AN ENGINE

[75] Inventors: Mamoru Yoshioka; Yasuhiro Oi, both of Susono, Japan

[73] Assignee: Toyota Jidosha Kabushiki Kaisha, Aichi, Japan

[21] Appl. No.: 901,448

[22] Filed: Jul. 28, 1997

[30] Foreign Application Priority Data

Jul. 29, 1996 [JP] Japan .................. 8-199111

[51] Int. Cl.⁶ .................. F02M 23/03
[52] U.S. Cl. .................. 123/586; 123/587
[58] Field of Search .................. 123/585–587, 123/531, 308

[56] References Cited

U.S. PATENT DOCUMENTS

| | | |
|---|---|---|
| 4,336,779 | 6/1982 | Semence .................. 123/586 |
| 4,553,514 | 11/1985 | Namba et al. .................. 123/308 |
| 5,269,283 | 12/1993 | Thompson .................. 123/585 |

FOREIGN PATENT DOCUMENTS

| | | | |
|---|---|---|---|
| 54-103913 | 8/1979 | Japan .................. | 123/308 |
| 55-40212 | 3/1980 | Japan .................. | 123/308 |
| 57-119139A | 7/1982 | Japan . | |
| 57-129234 | 8/1982 | Japan .................. | 123/586 |
| 62-13107A | 8/1994 | Japan . | |

*Primary Examiner*—Erick R. Solis
*Attorney, Agent, or Firm*—Kenyon & Kenyon

[57] ABSTRACT

An air assist device comprising a plurality of air intake ports formed in the inner wall of an intake duct around a throttle valve. The assist air is taken in from the air intake ports. The amount of opening of the air intake ports is controlled by the outer peripheral end face of the throttle valve. The cross-sectional shapes of the air intake ports are made easily formed circular cross-sectional shapes.

12 Claims, 8 Drawing Sheets

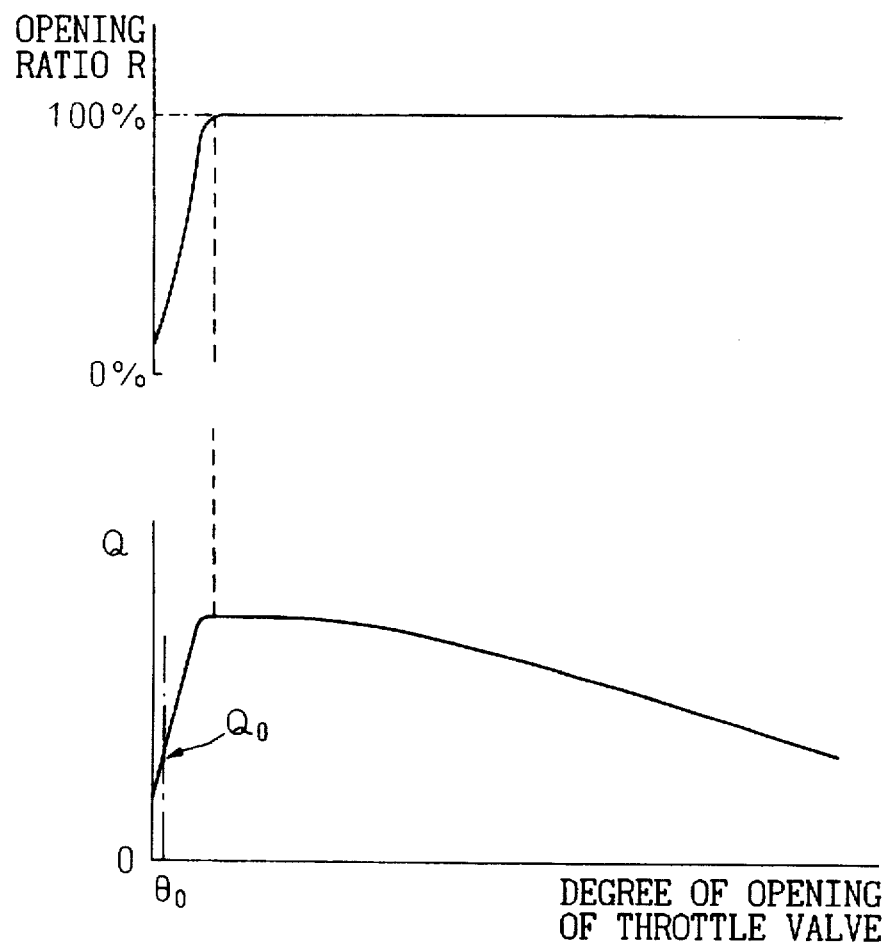

AIR ASSIST DEVICE OF AN ENGINE

BACKGROUND OF THE INVENTION

1. Field of the Invention

The present invention relates to an air assist device of an engine.

2. Description of the Related Art

To atomize the fuel injected from a fuel injector, use has conventionally been made of an air assist device which arranges the fuel injector in the intake passage downstream of the throttle valve, branches off an assist air passage from the intake passage upstream of the throttle valve, and blows the assist air ejected from an assist air ejection port of the assist air passage against the fuel injected from the fuel injector. When atomizing fuel using assist air in this way, however, it is necessary to control the amount of assist air to the optimal amount of assist air for the engine operating state. Therefore, a flow control valve is usually provided in the assist air passage. If such a flow control valve is provided, however, the manufacturing cost rises. Therefore, known in the art is an air assist device which does not provide a flow control valve in the assist air passage, but forms an air intake port of the assist air passage in the inside wall of the intake passage and controls the area of opening of the air intake port by the outer peripheral end face of a throttle valve (see Japanese Unexamined Patent Publication (Kokai) No. 57-119139).

In the related art, however, the area of the flow channel of the assist air is increased along with an increase of the amount of intake air when the amount of intake air is small and is held substantially constant when the amount of intake air exceeds a certain value. Therefore, the amount Q of assist air changes about as shown by the solid line in FIG. 11 with respect to the throttle opening degree. That is, at the time of idling operation, there is an optimal amount of assist air as shown by $Q_0$ in FIG. 11. On the other hand, the optimal amount of assist air gradually increases from $Q_0$ as the throttle opening degree becomes larger. When the throttle opening degree becomes large to a certain extent, the area of the flow channel of the assist air becomes constant, so the amount of assist air no longer increases. When the throttle opening degree becomes further larger next, the difference in pressure before and after the throttle valve becomes smaller, so the amount of assist air is gradually reduced.

FIG. 12A to FIG. 12E show various examples of the case of control of the area of opening of an air intake port Z of assist air formed in the inside wall of an intake passage X by the throttle valve Y arranged in the intake passage X. Note that in FIG. 12A to FIG. 12E, the throttle valve Y is shown at the idling position and the intake air flows in the intake passage X from the top to the bottom.

When the air intake port Z is formed in the inner wall of the intake passage X, considering the ease of processing and dimensional accuracy, the air intake port Z is preferably drilled. Therefore, the sectional shape of the air intake port Z is preferably circular. FIG. 12A to FIG. 12D show the case where the sectional shape of the air intake port Z is made circular. Further, FIG. 12A shows the case where the air intake port Z is formed with a relatively small diameter, while FIG. 12B, FIG. 12C, and FIG. 12D show the case where the air intake port 2 is formed with a relatively large diameter.

As shown in FIG. 12A, if the sectional shape of the air intake port Z is formed as a relatively small diameter circular shape, the area of the flow channel of the assist air becomes considerably small and as a result, as shown by the broken line $Q_1$ in FIG. 11, the amount of assist air becomes considerably small overall with respect to the optimal value shown by the solid line. Therefore, in this case, it becomes difficult to promote the atomization of the injected fuel well.

To promote the atomization of the injected fuel, it is necessary to increase the amount of the assist air. Therefore, it is necessary to increase the area of the flow channel of the air intake port Z. FIG. 12B shows the case of forming the sectional shape of the air intake port Z as a relatively large circular sectional shape and thereby increasing the area of the flow channel of the air intake port Z. In this case, however, if the air intake port Z is arranged so as to open at both the upstream side and downstream side of the throttle valve Y as shown in FIG. 12B, the intake air will not flow into the air intake port Z at the time of idling operation but will flow into the intake passage X downstream of the throttle valve Y as shown by the arrow F. Therefore, in this case, even if the area of the flow channel of the air intake port Z is increased, it is not possible to increase the amount of assist air at the time of an idling operation.

On the other hand, FIG. 12C shows the case of arrangement of an air intake port Z having a relatively large diameter circular sectional shape so as to open just at the upstream side of the throttle valve Y. In this case, the intake air flows into the air intake port Z, so the amount of assist air increases overall as shown by the broken line $Q_3$ in FIG. 11. In this case, however, the area of the opening of the air intake port Z in the intake passage X at the time of an idling operation becomes considerably large, so, as will be understood from the broken line $Q_3$ in FIG. 11, the amount of assist air at the time of an idling operation will end up becoming considerably larger than the optimal value $Q_0$.

On the other hand, if the sectional area of the air intake port Z is made smaller so that the amount of assist air at the time of an idling operation becomes the optimal value $Q_0$, as shown by the broken line $Q_2$ of FIG. 11, the amount of assist air at the time when the throttle valve Y opens will end up becoming smaller than the optimal value shown by the solid line. That is, no matter what the sectional area of the air intake port Z is made and no matter what the positional relationship between the air intake port Z and the throttle valve Y is made, it is not possible to obtain the optimal amount of assist air shown by the solid line in FIG. 11.

As opposed to this, as shown by FIG. 12D, if the thickness of the valve body of the throttle valve Y is made greater, the amount of assist air can be made the optimal value as shown by the solid line in FIG. 11. If the thickness of the valve body of the throttle valve Y is made greater in this way, however, the resistance of the flow channel of the intake passage X at the time of an engine high load operation will become greater and therefore it will not be possible to obtain a high engine output. Therefore, it is not possible to make the thickness of the valve body of the throttle valve Y greater as shown by FIG. 12D.

Further, if the sectional shape of the air intake port Z is made a narrow elongated hole as shown in FIG. 12E, it is possible to make the amount of assist air the optimal value $Q_0$ shown in FIG. 11 at the time of idling operation and further it is possible to secure the optimal amount of assist air as shown by the solid line in FIG. 11 when the throttle opening degree becomes large. To make the sectional shape of the air intake port Z a narrow elongated hole shape, however, machining by a milling machine or electrodeposition or other complicated and lengthy processing becomes necessary, therefore there is the problem that a large increase 5,797,382

3 in costs is incurred. Further, if punching using a press is adopted, it is possible to form the narrow elongated hole in a short time, but press working causes stress in the intake duct and results in the problem that the amount of intake air and the amount of assist air at the time of idling operation will end up varying for each intake duct.

As clear from the above explanation, when controlling the amount of assist air by the throttle valve Y, it can be said to be preferable to make the sectional shape of the air intake port Z circular in consideration of the ease of processing and the precision of processing. So long as just a single air intake port Z is provided and the amount of assist air flowing from the air intake port Z is controlled by a throttle valve Y as in the related art, however, it is not possible to secure the optimal amount of assist air.

SUMMARY OF THE INVENTION

An object of the present invention is to provide an air assist device capable of correctly controlling the amount of assist air by using circular cross-section air intake ports.

According to the present invention, there is provided an air assist device of an engine having an intake passage and a fuel injector arranged in the intake passage, the device comprising an assist air passage for feeding assist air to fuel injected from the fuel injector; a throttle valve arranged in the intake passage upstream of the fuel injector; and a plurality of circular cross-section air intake ports formed in an inner wall of the intake passage and arranged to be aligned along an outer peripheral edge of the throttle valve when the throttle valve is positioned at an idling position, the air intake ports being connected to the assist air passage and being at least partially covered at the same time by an outer peripheral end face of the throttle valve when the throttle valve is positioned at an idling position, an amount of assist air fed into the assist air passage being controlled by the throttle valve.

BRIEF DESCRIPTION OF THE DRAWINGS

These and other objects and features of the present invention will become more apparent from the following description of the preferred embodiments given with reference to the attached drawings, in which:

FIG. 8 is a view of the opening ratio R of the air intake ports and the amount Q of assist air;

4

DESCRIPTION OF THE PREFERRED EMBODIMENTS

Figure 1:
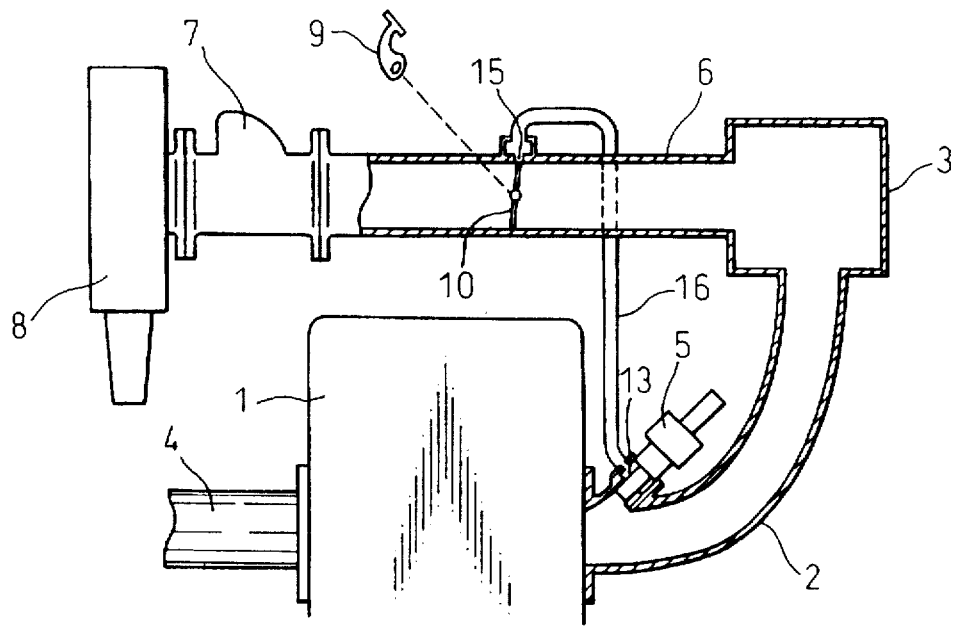
FIG. 1 is an overall view of an internal combustion engine.

Referring to FIG. 1, 1 is an engine body, 2 an intake tube, 3 a surge tank, and 4 an exhaust manifold. A fuel injector 5 is attached at each intake tube 2 to inject fuel into the intake port of the corresponding cylinder. The surge tank 3 is connected through an intake duct 6 and an air flow meter 7 to an air cleaner 8. A throttle valve 10 which can be controlled to open or close by an accelerator pedal 9 is arranged inside the intake duct 6.

Figure 2:
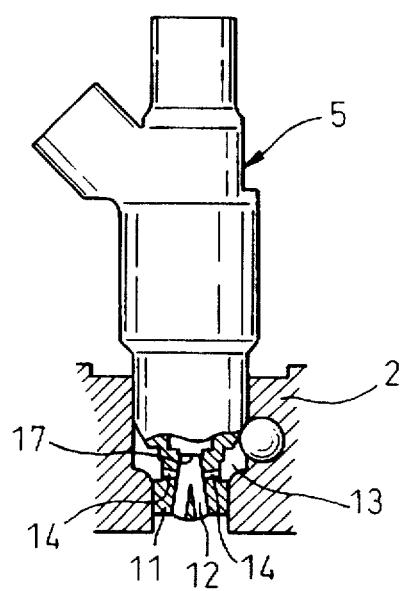
FIG. 2 is a partial sectional side view of an assist air type fuel injector.

As shown in FIG. 2, an assist air adapter 11 is attached to the front end of the fuel injector 5. The adapter 11 is provided with a fuel-air flow through hole 12 branched into two, an assist air chamber 13 formed around the adapter 11, and an assist air ejection port 14 opening inside the fuel-air flow through hole 12. On the other hand, as shown in FIG. 1, an air intake port 15 is formed in the inside wall of the intake duct 6 around the throttle valve 10. This air intake port 15 is connected through an assist air conduit 16 to the assist air chamber 13.

In the embodiment shown in FIG. 1, at least part of the air intake port 15 always opens inside the intake duct 6 upstream of the throttle valve 10. Therefore, the air inside the intake duct 6 upstream of the throttle valve 10 is fed by the difference between the pressure inside the intake duct 6 upstream of the throttle valve 10 and the pressure inside the intake tube 2 from the air intake port 15 through the assist air conduit 16 to the assist air chamber 13. Next, the air, that is, the assist air, is ejected from the assist air ejection port 14 to the inside of the fuel-air flow through hole 12. The fuel is ejected from the nozzle port 17 of the fuel injector 5 to the inside of the fuel-air flow through hole 12. The assist air ejected from the assist air ejection port 14 promotes the atomization of the injected fuel.

Figure 3:
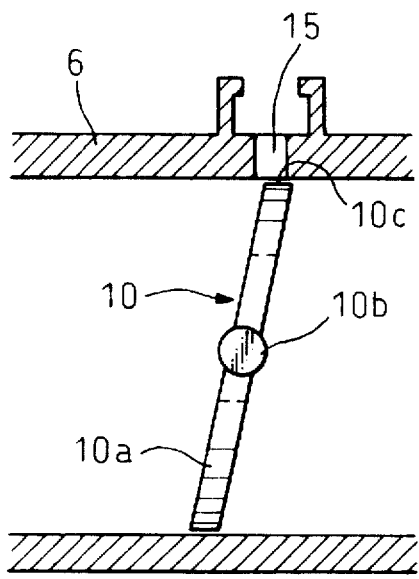
FIG. 3 is a side sectional view of the parts around the throttle valve of FIG. 1.
Figure 4:
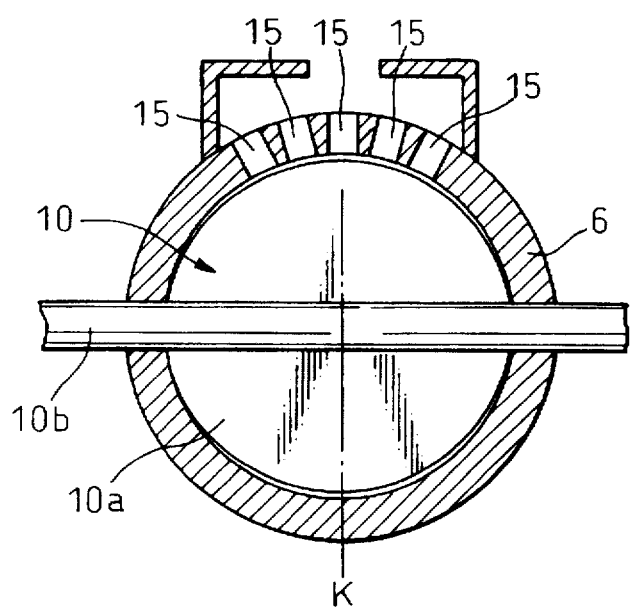
FIG. 4 is a sectional view of FIG. 3.

FIG. 3 and FIG. 4 are enlarged views of the parts around the throttle valve 10. As shown in FIG. 3 and FIG. 4, the inside wall of the intake duct 6 has a circular cross-section and the valve body 10a of the throttle valve 10 has a circular contour. The valve stem 10b of the throttle valve 10 extends substantially in the horizontal direction. A plurality of air intake ports 15 are formed at the top of the inside wall of the intake duct 6 furthest away from the valve stem 10b. In the embodiment shown in FIG. 3 and FIG. 4, five air intake ports 15 are arranged symmetrically with respect to the symmetrical plane perpendicular to the valve stem 10b, but it is also possible to symmetrically arrange six or more or four or less air intake ports 15 with respect to the symmetrical plane K.

In the embodiment shown in FIG. 3 and FIG. 4, the air intake ports 15 have circular sectional shapes of the same diameter. These air intake ports 15 are drilled from the outside wall of the intake duct 6, therefore the air intake ports 15 extend in the radial direction of the intake duct 6.

Figure 5:
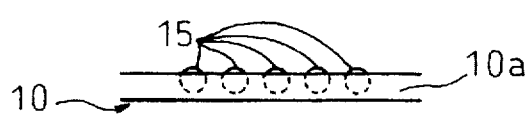
FIG. 5 is a view of the positional relationship between the valve body of the throttle valve and the air intake ports.

FIG. 3 and FIG. 4 show when the throttle valve 10 is in the idling position. FIG. 5 shows the positional relationship between the valve body 10a and the air intake ports 15 at the time when the throttle valve 10 is in the idling position when seen along the valve body 10a of the throttle valve 10. As shown in FIG. 3 and FIG. 5, the air intake ports 15 are arranged so that large parts of the opening portions of the air intake ports 15 are covered by the outer peripheral end face 10c of the throttle valve 10 and just the upstream side end regions of the opening portions of the air intake ports open to the inside of the intake duct upstream of the throttle valve 10 when the throttle valve 10 is in the idling position. Note that in the embodiment shown in FIG. 3 to FIG. 5, the areas of the upstream side end regions of the opening portions of the air intake ports at this time all become equal.

Note that the throttle valve 10 is slanted with respect to the lateral cross-section of the intake duct 6 as shown in FIG. 3 when at the idling position. The air intake ports 15 are formed to be aligned along the peripheral edge of the valve body 10a as shown in FIG. 5 at this time. That is, the further an air intake port 15 is from the plane K of symmetry of FIG. 4, the more to the upstream side it is positioned. Therefore, the air intake ports 15 are aligned at the same lateral cross-section of the intake duct 6.

Figure 6:
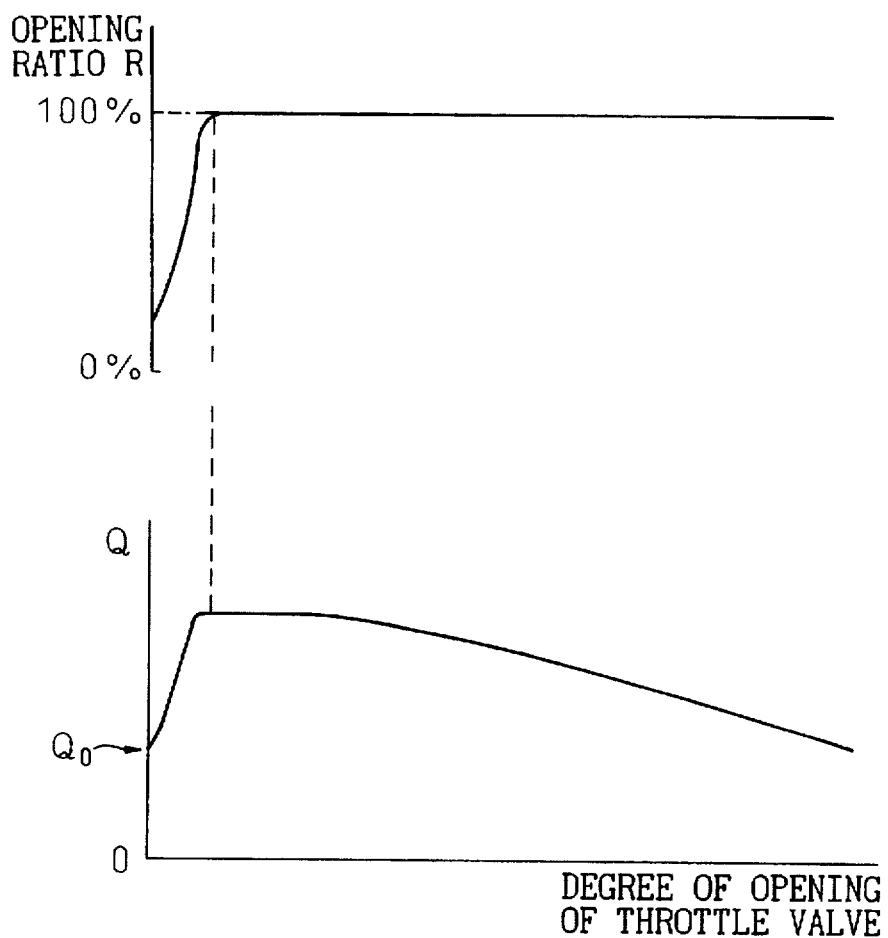
FIG. 6 is a view of the opening ratio R of the air intake ports and the amount Q of assist air.
Figure 11:
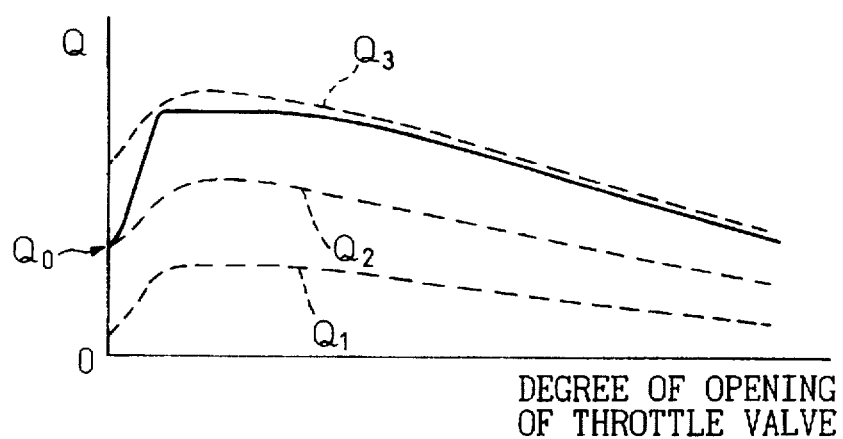
FIG. 11 is a view of the amount Q of assist air.
Figure 12A:
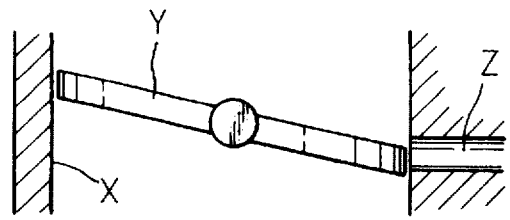
FIGS. 12A to 12E are views for explaining the relationship between the throttle valve and the air intake port.
Figure 12B:
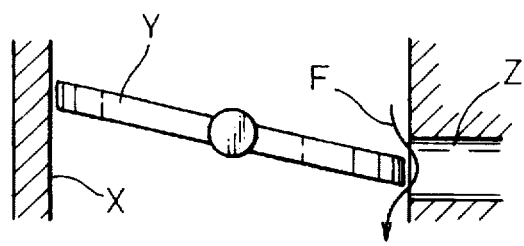
Figure 12C:
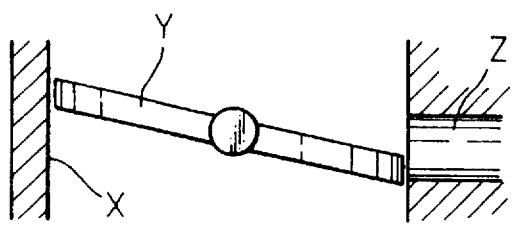
Figure 12D:
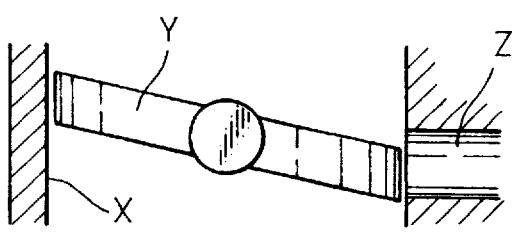
Figure 12E:
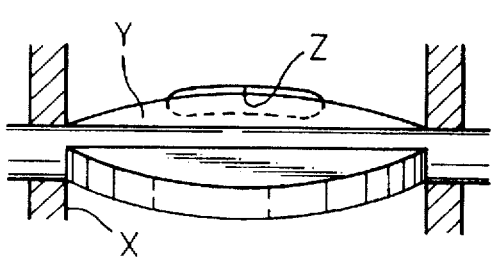

FIG. 6 shows the relationship between the opening ratio R of the opening portion of the air intake port 15 into the intake duct 6 upstream of the throttle valve 10 and the throttle opening degree in the embodiment shown in FIG. 3 to FIG. 5 and the relationship of the amount Q of assist air and the throttle opening degree. As shown from FIG. 3 to FIG. 5, if a plurality of air intake ports 15 are provided, the total flow area of the air intake ports 15, that is, the area of the flow channel of the assist air, can be made considerably large, while the opening ratio R at the time of idling operation can be made considerably small. As a result, it is possible to make the amount Q of assist air match the optimal value shown by the solid line in FIG. 11. Note that $Q_0$ in FIG. 6 shows the optimal amount of assist air at the time of an idling operation in the same way as $Q_0$ shown in FIG. 11.

Figure 7:
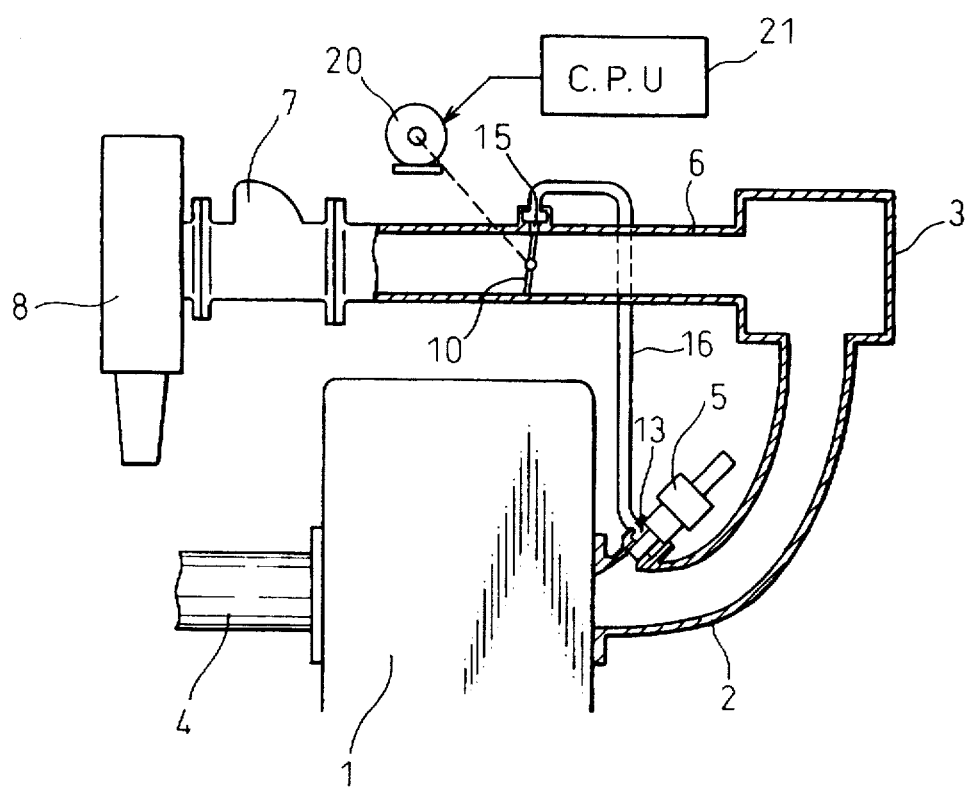
FIG. 7 is an overall view of another embodiment of an internal combustion engine.

FIG. 7 shows another embodiment. In this embodiment, the throttle valve 10 is controlled to open and close by a drive motor 20. This drive motor 20 is in turn controlled based on an output signal of an electronic control unit 21. That is, in this embodiment, for example, the drive motor 20 is driven in accordance with the amount of depression of the accelerator pedal, whereby the opening degree of the throttle valve 10 is controlled. Further, in this embodiment, the amount of the assist air is controlled by the throttle valve 10 so that the engine speed becomes the target idling speed at the time of idling operation.

That is, in this embodiment, as shown in FIG. 8, when the throttle opening degree is the opening degree $\theta_0$ just slightly larger than the opening degree at the time of idling, the opening ratio R is set so that the amount Q of assist air becomes substantially the optimal amount of assist air $Q_0$ at the time of idling. If the engine speed becomes higher than the target idling speed at the time of an idling operation, the throttle opening degree is reduced and the amount of assist air is reduced, while if the engine speed becomes lower than the target idling speed, the throttle opening degree is increased and the amount of assist air is increased, so the engine speed is maintained at the target idling speed.

Figure 9A:
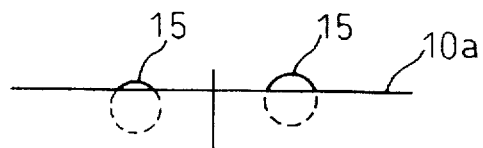
FIGS. 9A to 9D are views of various examples of arrangement of the air intake ports.
Figure 9B:
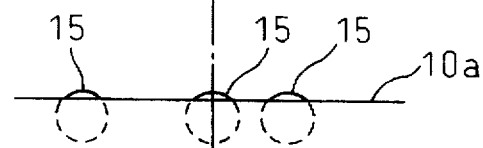
Figure 9C:
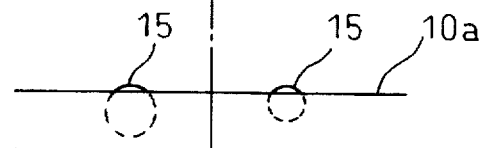
Figure 9D:
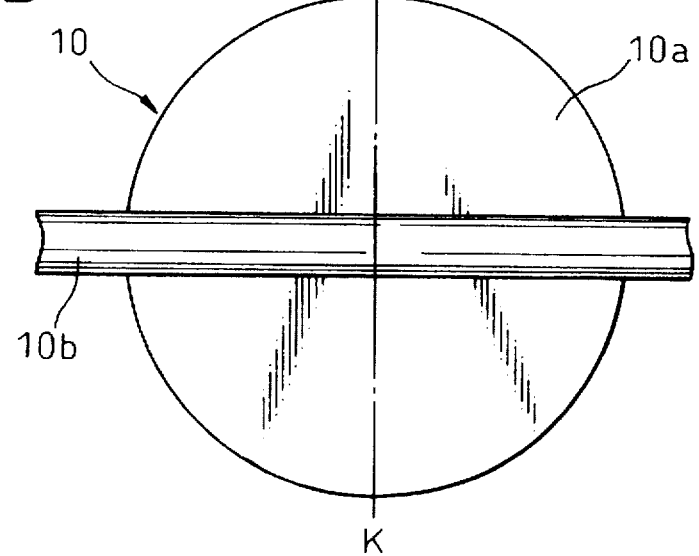

FIGS. 9A, 9B, and 9C show various embodiments relating to the arrangement of the air intake ports 15. Note that FIGS. 9A, 9B, and 9C show the positional relationships between the air intake ports 15 and the valve body 10a at the time of an idling operation seen along the valve body 10a of the throttle valve 10. In FIGS. 9A to 9D, the broken line K shows the plane passing through the center of the valve body 10a and perpendicular to the valve stem 10b.

FIG. 9A shows the case of arrangement of a pair of air intake ports 15 of the same diameter at equal distances from the plane K and the arrangement of one air intake port 15 more upstream than the other air intake port 15. If arranged in this way, when the throttle valve 10 starts to open from the idling position and just before the air intake ports 15 open fully in the intake duct 6 upstream of the throttle valve 10, the amount of change of the amount of assist air with respect to the throttle opening degree can be made smaller.

FIG. 9B shows the case of provision of three air intake ports 15 of the same diameter, arrangement of one of the air intake ports 15 on the plane K, and arrangement of the remaining two air intake ports 15 at different distances away from the plane K. The opening ratio R of the air intake ports 15 to the intake duct 6 upstream of the throttle valve 10 becomes smaller the further the air intake port 15 is from the plane K when the throttle opening degree is the same. Therefore, in the case shown in FIG. 9B, when the throttle valve 10 is made to open, the air intake ports open fully successively starting from the one nearest the plane K.

FIG. 9C shows the case of arranging a pair of air intake ports 15 of different diameters at equal distances from the plane K. In this case, when the throttle valve 10 is made to open, first the small diameter air intake port 15 fully opens, then the large diameter air intake port 15 fully opens.

As shown in FIGS. 9A, 9B, and 9C, by changing the position of formation or diameter of the plurality of air intake ports 15, it is possible to change in various ways the amount of increase of the amount of assist air with respect to an increase in the throttle opening degree.

Figure 10:
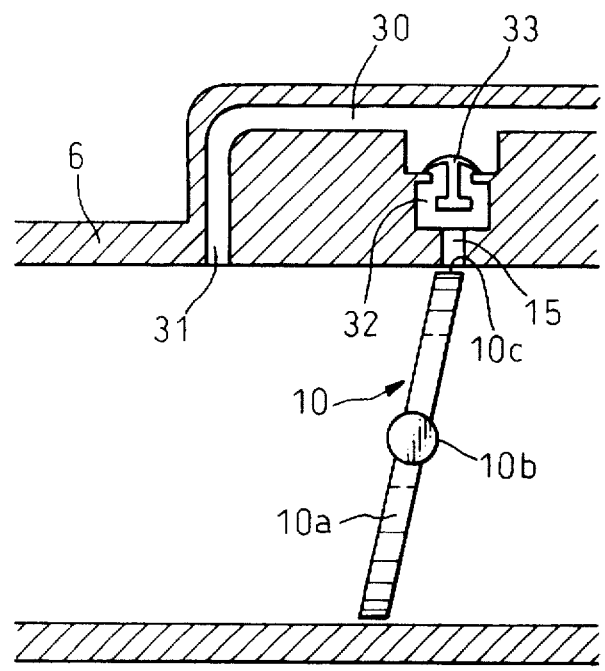
FIG. 10 is a side sectional view of another embodiment of the parts around the throttle valve.

FIG. 10 shows still another embodiment. In this embodiment as well, five air intake ports 15 are formed at the same positions as in the example shown in FIG. 3 and FIG. 4. Further, in this embodiment, an assist air passage 30 connected to the assist air conduit (FIG. 1) is formed in the wall of the intake duct 6. The air intake port 31 of the assist air passage 30 is formed in the inner wall of the intake duct 6 positioned at the upstream side of the throttle valve 10 at all times. Further, a common assist air chamber 32 connected to all of the air intake ports 15 is formed in the wall of the intake duct 6. This assist air chamber 32 is connected to the assist air passage 30 through a check valve 33 enabling flow only from the assist air chamber 32 to the assist air passage 30.

In this embodiment, as shown in FIG. 10, when the throttle valve 10 is in the idling position, all of the air intake ports 15 are completely covered by the outer peripheral end face 10c of the throttle valve 10. At this time, the entire assist air is fed from the air intake port 31. At this time, a negative pressure acts on the air input ports 15, therefore, if the check valve 33 is not provided, the assist air flowing from the air intake port 31 will end up escaping through the air intake ports 15 to the inside of the intake duct 6 downstream of the throttle valve 10. As a result, sufficient assist air will no longer be fed for the injected fuel and therefore the injected fuel will no longer be able to be atomized well. Therefore, in the embodiment shown in FIG. 10, the check valve 33 is provided to prevent the assist air flowing from the air intake port 31 from escaping through the air intake ports 15 at the time of an idling operation.

When the throttle valve 10 opens and the air intake ports 15 open inside the intake duct 6 upstream of the throttle valve 10, the assist air is fed into the assist air passage 30 through the check valve 33 from the air intake ports 15 as well. Therefore, the amount of assist air increases along with an increase in the throttle opening degree until the air intake ports 15 open fully.

As explained above, according to the present invention, it is possible to control the amount of assist air to the optimal amount of assist air using easily processable circular cross-section air intake ports.

While the invention has been described by reference to specific embodiments chosen for purposes of illustration, it should be apparent that numerous modifications could be made thereto by those skilled in the art without departing from the basic concept and scope of the invention.

We claim:

1. An air assist device of an engine having an intake passage and a fuel injector arranged in the intake passage, said device comprising:

an assist air passage for feeding assist air to fuel injected from the fuel injector;

a throttle valve arranged in the intake passage upstream of the fuel injector; and a plurality of circular cross-section air intake ports formed in an inner wall of the intake passage and arranged to be aligned along an outer peripheral edge of the throttle valve when the throttle valve is positioned at an idling position, said air intake ports being connected to said assist air passage and being at least partially covered at the same time by an outer peripheral end face of the throttle valve when the throttle valve is positioned at an idling position, an amount of assist air fed into said assist air passage being controlled by said throttle valve.

2. An air assist device as set forth in claim 1, wherein when the throttle valve is at the idling position, portions of the openings of the air intake ports open in the intake passage upstream of the throttle valve and the remaining portions of the openings of the air intake ports are covered by the outer peripheral end face of the throttle valve and when the throttle valve opens, the entire openings of the air intake ports open in the intake passage upstream of the throttle valve.

3. An air assist device as set forth in claim 1, wherein the air intake ports are arranged to be distributed at the two sides of the plane passing through the center of the throttle valve and perpendicular to the throttle axis.

4. An air assist device as set forth in claim 1, wherein all of the air intake ports have the same diameter.

5. An air assist device as set forth in claim 3, wherein the air intake ports are arranged symmetrically with respect to the plane.

6. An air assist device as set forth in claim 5, wherein one of the air intake ports is arranged on said plane.

7. An air assist device as set forth in claim 3, wherein the air intake ports are arranged asymmetrically with respect to said plane.

8. An air assist device as set forth in claim 3, wherein said air intake ports arranged at one side of said plane are positioned at an upstream side of the intake passage with respect to the air intake ports arranged at the other side of said plane.

9. An air assist device as set forth in claim 3, wherein said air intake ports arranged at one side of said plane have diameters different from the air intake ports arranged at the other side of said plane.

10. An air assist device as set forth in claim 1, wherein an opening degree of the throttle valve is controlled by an accelerator pedal.

11. An air assist device as set forth in claim 1, comprising an actuator for controlling an opening degree of the throttle valve and control means for controlling said actuator so that the idling speed of the engine becomes a predetermined speed.

12. An air assist device as set forth in claim 1, wherein a check valve allowing flow only from said air intake ports to the injected fuel is arranged in said assist air passage to connect the assist air passage downstream of said check valve to the intake passage positioned at the upstream side of the throttle valve at all times.

* * * * *